April 8, 1930.  G. R. WOOD  1,753,635
GRINDING DEVICE FOR MEAT SLICING MACHINES
Filed May 28, 1923
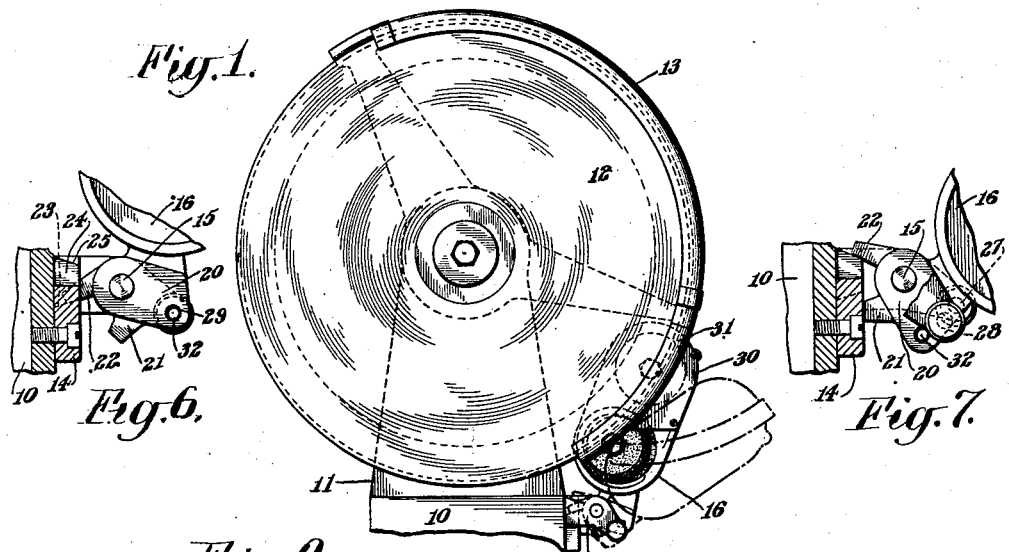
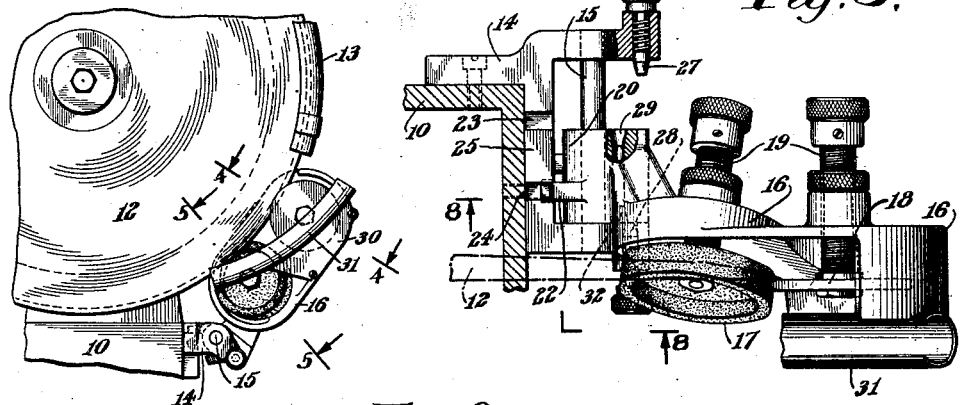
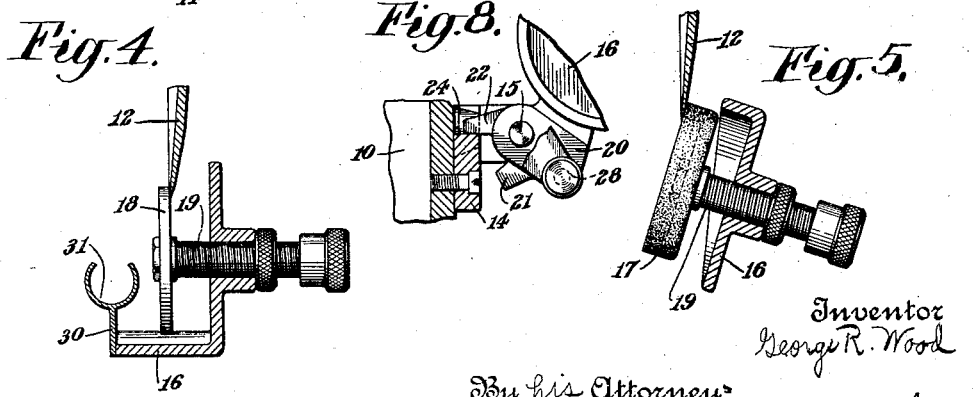
Inventor
George R. Wood
By his Attorney
Cooper, Kerr & Dunham Patented Apr. 8, 1930

1,753,635

UNITED STATES PATENT OFFICE

GEORGE RUE WOOD, OF DAYTON, OHIO, ASSIGNOR TO DAYTON SCALE COMPANY, OF DAYTON, OHIO, A CORPORATION OF NEW JERSEY

GRINDING DEVICE FOR MEAT-SLICING MACHINES

Application filed May 28, 1923. Serial No. 642,008.

This invention relates to improvements in grinding devices for meat slicing machines and the like, and is more particularly directed to improvements in the grinding devices shown and described in the patent to Hopkinson and Thomas, No. 1,263,414. In the above patent a grinding device was provided in which the grinder assembly and box were adapted to be displaced to and from a cooperative position adjacent the knife by a pivotal swinging of the box. The arrangement was such that to properly guard the knife the box was normally retained in a position adjacent the knife and the grinders were individually retracted away from the edge of the knife.

It is the object of the present invention to improve the construction shown in the above patent to the general end that during normal running of the machine the grinder devices and their containing box may be bodily displaced laterally with respect to the knife whereby particles of meat, grease and like material will not be thrown into the box and upon the grinder wheels. Provision is made for guarding the knife at such times when the grinder device is laterally displaced by means of a supplementary guard which is carried by the grinder box assembly. Other objects and advantages of the improved construction will be more fully set forth in the accompanying specification and claims and shown in the drawings which by way of illustration portray the preferred embodiment of my invention.

In the drawings—

Fig. 1 is a side view of the grinder device in normal position, i. e. when slicing is being effected.

Fig. 2 shows the grinder assembly displaced to so-called grinding position.

Fig. 3 is a top plan view of the grinder assembly with the parts shown swung down and released from the locking devices. In this position the grinder assembly can be displaced laterally to be in or out of alignment with the knife.

Figs. 4 and 5 are detail sectional views taken on lines 4—4 and 5—5, respectively, of Fig. 2 and showing the burr removing and knife grinding devices respectively.

Fig. 6 is a detail view of certain of the parts shown in Fig. 3 in moved position, the section being taken on line 6—6 of Fig. 3.

Fig. 7 is a view of the same parts in a different position.

Fig. 8 is a view of these parts in a third position. This section is taken on line 8—8 of Fig. 3.

In more detail, the meat slicer proper is shown in a fragmentary view and comprises the base portion 10 of the knife pedestal 11, the concavo-convex knife 12 which has a segment thereon guarded by a fixed guard 13. Attached to the base portion is a U-shaped bracket 14 which carries a cross shaft 15 which forms a pivotal support for the grinder assembly. The grinder box 16 is of any suitable shape to partially encase the grinder wheel 17 and the burr removing wheel 18. These wheels are rotatably mounted upon threaded studs 19 which are adjustable in the casing. The manipulation of the wheels for grinding and removing the burr from the knife is effected in manner described in the patent heretofore referred to.

Partially or wholly covering the open side of the grinder box and secured to the box by suitable screws is a cover plate 30 to which is fastened a supplementary knife guard 31.

The burr removing wheel 18 is preferably a cylindrical steel disc instead of the emery wheel heretofore employed.

Preferably integral with the grinder box casting is a sleeve 20 which is drilled to receive shaft 15 so that the grinder assembly as a whole can be slid laterally upon the shaft or rocked up or down. Downward rocking movement of the grinder box is limited by an integral stop 21 which is adapted to contact against the side of the bracket 14 as shown in Fig. 7. When the grinder assembly is in this position it may be freely slid back or forth on the shaft 15.

The U-shaped frame 14 is provided with two notches 23 and 24 the former being deeper than the latter, as shown by the dotted lines in Fig. 6. Intermediate the notches, the top surface of the frame is beveled downwardly as shown at 25. Integral with sleeve 20 is a lug 22 which is adapted to enter either notch 23 or 24 when the lug is properly aligned with one or the other notches and the grinder assembly tipped upwardly. When in intermediate position, the lug engaging with the beveled surface 25 prevents the upward tipping of the grinder box and thus prevents the wheels or grinder box supplemtal guard from inadvertently being brought against the knife. The unbeveled ends of the upper surface of the frame 14 constitutes stops to prevent the grinder box being slid beyond the aligning position.

To secure the grinder assembly in either of its upper positions, two spring pressed taper pins 27 and 28 are provided which are carried by the arms of the bracket 14 and which are adapted to enter respective tapered recesses 29 or 32 in the boss 20.

In normal slicing operations the grinder assembly is in the position shown in Fig. 1 with the supplemental guard 31 in alignment with the main guard and with the grinder wheels to one side of the plane of the knife, so that foreign matter from the knife will be deposited in the supplemental guard instead of upon the wheels or inside the grinder box. With the parts in this position, lug 22 will enter the deep notch 23 and the grinder assembly will be retained in position by taper pin 27 which enters recess 29. To shift to grinding position, taper plunger 27 is withdrawn, the grinder assembly is rocked down until the position of the parts shown in Fig. 7 is reached. Then the assembly is slid along the shaft until lug 22 aligns with notch 24. The box is then rocked upwardly until taper plunger 28 snaps into the recess 32. The parts will now be in the position shown in Fig. 2 with the grinder wheels aligned with the knife in the manner shown in Figs. 4 and 5.

The supplementary guard will now be to one side of the plane of the knife as shown in Fig. 4. In this position accumulated matter may be removed from the guard.

The improved grinder box herein described not only is more sanitary than the device previously employed but also is better adapted to effect the grinding operation upon the knife since the wheels do not become clogged with particles of meat.

What I claim is:—

1. A grinder device for a slicing machine comprising a grinder assembly for a circular knife having its periphery guarded by a main guard, a supplemental guard carried by said assembly, said assembly including a grinder box with grinder mechanism therein, said box forming a guard for the knife when the grinding mechanism is in grinding position, and means for mounting said assembly to permit it to be laterally shifted with respect to the knife to bring the grinders to one side of the knife and the supplemental guard into alignment with the knife, said assembly when oppositely displaced bringing the grinders and the enclosed guarding box into alignment with the knife and the supplemental guard out of alignment therewith.

2. A grinder device for a rotary slicing knife, comprising a support fixed relative to said knife, grinder mechanism including a frame mounted on said support for sliding movement thereon in a direction angular to the plane of the knife into a position in alinement with the knife edge, said grinder mechanism frame being also mounted for movement on said support in a direction parallel to the plane of the knife into a position for grinding the knife edge, and means for preventing the latter movement of the grinder mechanism before the first mentioned movement has been effected.

3. In a meat slicer having a circular knife, in combination, a support, grinder assembly mounted thereon, said mounting comprising manipulable means to permit said assembly to be displaced by sliding the same in a direction parallel with the axis of the knife whereby the grinder devices may be brought into or out of alignment with the knife, said mounting also comprising pivot devices to permit the pivotal swinging of said assembly in planes parallel to the plane of said knife for the purpose described.

4. In a meat slicing machine having a circular knife, in combination, a support, a grinder assembly pivotally and axially displaceable on said support as a unit with respect to the axis of the knife, and means to prevent said axial displacement prior to said pivotal displacement.

5. In a meat slicing machine having a circular knife, in combination, grinding devices for said knife adapted to grind both sides thereof, a carrier supporting said devices for pivotal movement in planes parallel to the plane of the knife and for slidable movement parallel to the axis of the knife, and means for limiting the pivotal movement of said devices on said support.

6. In a meat slicing machine having a circular knife, in combination, grinding devices for said knife, a support for said devices pivotally movable in planes parallel to the plane of the knife and slidably movable in a direction parallel to the axis of the knife.

7. A grinder device for a meat slicer having a circular knife rotating in a vertical plane, said device including a supporting member, a grinder assembly including a frame slidably mounted on said member for movement in a direction parallel to the axis of the knife and also pivotally movable relative to said member in planes parallel to the plane of the knife, and means for aligning said assembly at particular lateral positions or planes relatively to the knife in which pivotal displacement of said assembly may be effected.

8. A grinder device for a meat slicer having a circular knife rotating in a vertical plane, said device including a supporting member, a grinder assembly slidably mounted thereon for movement between two extreme positions in a direction parallel to the axis of the knife, means at either of said positions for permitting said assembly to swing on said support from one extreme pivotal position to another in a plane parallel to the plane of the knife, and means for locking said assembly in either of said pivotal positions.

9. A pivotal and slidably mounted grinder assembly for a meat slicing machine having a circular knife rotating in a vertical plane, and means on said assembly for preventing pivotal displacement of said assembly in planes parallel with the plane of the knife at other than predetermined positions with respect to the plane of said knife.

10. A grinder device for a slicing machine having a movable knife comprising grinding mechanism and mounting means therefor permitting shifting of the grinder mechanism into and out of grinding relationship with the knife and a guard associated with said grinding mechanism mounted for movement into guarding position with respect to said knife when the grinding mechanism is out of grinding relationship.

11. A grinder device for a slicing machine having a movable knife comprising grinding mechanism and mounting means therefor permitting shifting of the grinder mechanism into and out of grinding relationship with the knife and a guard fixed on said grinding mechanism mounted for movement into guarding position with respect to said knife when the grinding mechanism is out of grinding relationship.

12. In a meat slicer having a circular knife, a grinder support, a grinder assembly slidably mounted thereon, a knife guard fixed to said assembly, said assembly and knife guard being displaceable in a direct parallel with the axis of the knife and means for aligning the grinder assembly and knife guard in a plurality of fixed laterally spaced positions in one of which the grinding assembly is in grinding position and in another of which the guard is in protective relationship with the knife.

13. A grinder device for a meat slicer having a circular knife rotating in a vertical plane said device including a support having means for slidably and pivotally supporting a grinder assembly having a knife guard fixed thereto said slidable support permitting adjustment of the assembly and knife guard in a direction parallel with the axis of the knife and said pivotal support permitting the displacement of said assembly and knife guard in planes parallel to the plane of the circular knife and means for aligning said assembly and knife guard at particular lateral positions or planes relatively to the circular knife in which pivotal arrangement of said assembly and said knife guard may be effected.

In testimony whereof I hereto affix my signature.

GEORGE RUE WOOD.